United States Patent
Kulakov et al.

(10) Patent No.: US 8,233,923 B2
(45) Date of Patent: Jul. 31, 2012

(54) REDUCING SIGNALLING LOADS FROM A MOBILE NETWORK

(75) Inventors: Alexei Kulakov, Duesseldorf (DE); Yang Lu, Duesseldorf (DE); Peter Wild, Krefeld (DE)

(73) Assignee: Vodafone Holding GmbH (DE)

( * ) Notice: Subject to any disclaimer, the term of this patent is extended or adjusted under 35 U.S.C. 154(b) by 0 days.

(21) Appl. No.: 13/194,575

(22) Filed: Jul. 29, 2011

(65) Prior Publication Data

US 2011/0312348 A1 Dec. 22, 2011

Related U.S. Application Data

(63) Continuation of application No. PCT/EP2010/000308, filed on Jan. 20, 2010.

(30) Foreign Application Priority Data

Jan. 30, 2009 (EP) .................................... 09001314

(51) Int. Cl.
*H04W 68/00* (2009.01)
(52) U.S. Cl. ......... 455/458; 455/419; 455/450; 370/254
(58) Field of Classification Search .................. 455/458, 455/419, 450; 370/254
See application file for complete search history.

(56) References Cited

FOREIGN PATENT DOCUMENTS

EP 2214440 A1 8/2010

OTHER PUBLICATIONS

"3rd Generation Partnership Project; Technical Specification Group Services and System Aspects; General Packet Radio Service (GPRS) enhancements for Evolved Universal Terrestrial Radio Access Network (E-UTRAN) access (Release 8) 3GPP TS 23.401 V8.4.1 (Dec. 2008)" [Online] Dec. 2008, 3GPP , Sophia Antipolis, France, XP002535146 Retrieved from the Internet: URL:http://www.3gpp.org/ftp/Specs/html-inf /23401.htm>.

Vodafone: "Additional requirements for designing the control plane LCS for EUTRAN" 3GPP Draft; S2-090689 P-CR 23891V021 LCS CP Requirements, 3rd Generation Partnership Project (3GPP), Mobile Competence Centre ; 650, Route Des Lucioles ; F-06921 Sophia-Antipolis Cedex ; France, No. Phoenix; 20090112, Jan. 12, 2009, XP050333153.

Nokia Siemens Networks et al: "Idle State Signalling Reduction" 3GPP Draft; S2-074401, 3rd Generation Partnership Project (3GPP), Mobile Competence Centre ; 650, Route Des Lucioles ; F-06921 Sophia-Antipolis Cedex ; France, vol. SA WG2, No. Kobe; 20071008, Oct. 2, 2007, P050261205.

(Continued)

*Primary Examiner* — David Q Nguyen
(74) *Attorney, Agent, or Firm* — St. Onge Steward Johnston & Reens LLC (57) ABSTRACT

Method and device for reducing signalling loads from a mobile device to a mobile telecommunications network system due to intersystem changes. The network system comprises a first and second radio access technology having a first and second radio access network and a first and second network core operable to page a mobile device via at least one element each of the first and second radio access technology. When idle or inactive state signalling reduction ("ISR") is activated at the mobile device, the mobile device stores at least one first EPS bearer context and/or at least one first PDP context. After ISR is activated, at least one second EPS bearer context and/or at least one second PDP context is activated between the mobile device and the respective network. The respective network uses the stored at least one first contexts, or the at least one second contexts.

13 Claims, 3 Drawing Sheets

OTHER PUBLICATIONS

ZTE: "Idle State Reduction Function Principle" 3GPP Draft; S2-074967_ISR Principle, 3rd Generation Partnership Project (3GPP), Mobile Competence Centre; 650, Route Des Lucioles ; F-06921 Sophia-Antipolis Cedex ; France, vol. SAWG2, No. Ljubljana; 20071112, Nov. 2, 2007, XP050261709.

International Preliminary Report on Patentability and Written Opinion of the International Searching Authority; Application No. PCT/EP2010/000308; Issued: Aug. 2, 2011; 7 pages.

International Search Report; Application No. PCT/EP2010/000308; Issued: Mar. 26, 2010; 2 pages.

Decision to Grant a European Patent Pursuant to Article 97(1) EPC; Application No. EP 09001314.5-2412; Issued: Mar. 1, 2012; 2 pages.

REDUCING SIGNALLING LOADS FROM A MOBILE NETWORK

CROSS-REFERENCE TO RELATED APPLICATIONS

The present application is a continuation of pending International patent application PCT/EP2010/000308 filed on Jan. 20, 2010 which designates the United States and claims priority from European patent application 09 001314.5 filed on Jan. 30, 2009, the content of which is incorporated herein by reference.

FIELD OF THE INVENTION

The present invention relates to a method for reducing signalling loads from a mobile device to a mobile telecommunications network system comprising a first radio access technology having a first radio access network and a first network core operable to page a mobile device via at least one element of the first radio access technology and a second radio access technology having a second radio access network and a second network core operable to page a mobile device via at least one element of the second radio access technology due to intersystem changes.

Furthermore, the invention relates to a mobile device to be operated in a in a mobile telecommunication system including a first radio access technology having a first radio access network and a first network core operable to page a mobile device via at least one element of the first radio access technology and a second radio access technology having a second radio access network and a second network core operable to page a mobile device via at least one element of the second radio access technology, which mobile device is designed and/or adapted to at least partially carry out a method according to the invention.

BACKGROUND OF THE INVENTION

Currently 2G (GSM), 2.5G (GPRS) and 3G (UMTS/UTRA) mobile or cellular telecommunications network systems (PLMNs) co-exist. A development of the radio access network part of 3G mobile telecommunications is "evolved" UTRA or E-UTRA, also referred to as LTE (Long Term Evolution). "System Architecture Evolution" (SAE) is the development of the core network part of 3G mobile telecommunications. The combined core network and radio network development is sometimes referred to as SAE/LTE. It is desirable for mobile terminals to provide continuous service also when moving from a LTE coverage area to a 3G or 2G coverage area or vice versa from a 3G or 2G coverage area to a LTE coverage area.

To reduce signalling loads between a mobile device (UE: User Equipment) and the telecommunications network system while in idle state or idle mode, idle or inactive state signalling reduction, sometimes referred to as idle mode signalling reduction (ISR), is known. This is for example described in 3GPP TS 23.401, version 8.4.1 Release 8, which is fully incorporated herein by reference, see particularly Annex J: "High level ISR description".

In view of the usage of IP based services, it is envisaged that EPS bearer contexts (EPS: Evolved Packet System) and/or PDP contexts (PDP: Packet Data Protocol) are constantly created, modified, and possibly returned to their original state. From point of view of a mobile device, even though there is no "net" change in the EPS bearer contexts and/or PDP contexts when entering and leaving a first Radio Access Technology (RAT), for instance UTRAN/GERAN, a location update in the other Radio Access Technology (second RAT), for instance E-UTRAN, may still be needed based on the principles of ISR.

This undermines the efficiency of using ISR and leads to, that a mobile device needs to make location updates every time it changes radio access technology (RAT), even if its EPS bearer contexts and/or PDP contexts have effectively not changed. As a result the signaling loads the network. Additionally the last of the battery of the mobile device is shortening.

SUMMARY OF THE INVENTION

Based upon this state of the art, it is the object of the invention to improve the reducing of signalling loads from a mobile device to a mobile telecommunications network system comprising a first radio access technology, especially according to GSM/UMTS, having a first radio access network and a first network core operable to page a mobile device via at least one element of the first radio access technology and a second radio access technology, especially according to SAE/LTE, having a second radio access network and a second network core operable to page a mobile device via at least one element of the second radio access technology due to intersystem changes.

As technical solution the invention proposes a method for reducing signalling loads from a mobile device to a mobile telecommunications network system comprising a first radio access technology having a first radio access network and a first network core operable to page a mobile device via at least one element of the first radio access technology and a second radio access technology having a second radio access network and a second network core operable to page a mobile device via at least one element of the second radio access technology due to intersystem changes, wherein the mobile device stores at least one first EPS bearer context and/or at least one first PDP context at the time when an idle or inactive state signalling reduction (ISR) is activated at the mobile device and the respective network and for supporting mobile services uses the stored at least one first EPS bearer context and/or at least one first PDP context or at least one second EPS bearer context and/or at least one second PDP context, which at least one second EPS bearer context and/or at least one second PDP context is activated between the mobile device and the respective network after the activation of the idle or inactive state signalling reduction (ISR).

A preferred embodiment of the present invention is characterised in that said at least one first EPS bearer context and/or at least one first PDP context is an at least one priori EPS bearer context and/or at least one priori PDP context and in that said at least one second EPS bearer context and/or at least one second PDP context is an at least one posterior EPS bearer context and/or at least one posterior PDP context. A priori EPS bearer context and/or a priori PDP context according to the present invention is an EPS bearer context and/or a PDP context stored at the mobile device at the time when the idle or inactive state signalling reduction (ISR) is activated at the mobile device. According to the present invention there may advantageously be more than one such EPS bearer context and/or PDP context. A posterior EPS bearer context and/or a posterior PDP context according to the present invention is an EPS bearer context and/or a PDP context activated at the mobile device after the idle or inactive state signalling reduction (ISR) is activated.

The invention makes use of the knowledge that improvement of the idle or inactive state signalling reduction efficiency is reachable, especially by reducing of signalling loads from a mobile device to a mobile telecommunications network system, when the mobile device doesn't need to make location updates every time it changes radio access technology (RAT) if its EPS bearer contexts and/or PDP contexts have effectively not changed. This ensures that the battery of the mobile device lasts much longer while the mobile device makes location updates only when it really has to. Additionally, the unnecessary signalling loads in the network can be avoided.

Another advantageously embodiment of the invention is characterised in that for supporting mobile services at least one mobile service is started between the mobile device and a network. Advantageously such at least one mobile service between the mobile device and a network is started initiated by the mobile device and/or is started initiated by a network. A mobile service for example is to establish a context to setup a call or to establish any other context for a mobile service between the mobile device and a network.

An advantageous embodiment of the invention provides that the idle or inactive state signalling reduction (ISR) is deactivated, when and only when the existing at least one priori EPS bearer context and/or at least one priori PDP context is modified or deleted.

Another advantageous embodiment of the invention provides that the idle or inactive state signalling reduction (ISR) keeps activated, when no posterior EPS bearer context or posterior PDP context exists at the time when an intersystem change from the first network to the second network, preferred from UTRAN/GERAN to E-UTRAN, or from the second network to the first network, preferred E-UTRAN to UTRAN/GERAN, happens.

Another advantageous embodiment of the present invention is characterised in that when idle or inactive state signalling reduction (ISR) is activated at the mobile device and at least one mobile service between the mobile device and a network is started it is determined, whether the first EPS bearer context and/or the first PDP context stored at the mobile device is modified to setup such at least one mobile service between the mobile device and a network, whereby if the first EPS bearer context and/or the first PDP context stored at the mobile device is modified idle or inactive state signalling reduction (ISR) is deactivated and if the first EPS bearer context and/or the first PDP context stored at the mobile device is not modified, a second EPS bearer context and/or a second PDP context is established to setup such at least one mobile service between the mobile device and a network and idle or inactive state signalling reduction (ISR) is kept active after release such at least one mobile service between the mobile device and a network.

In another embodiment of the invention it is provided that said first radio access technology is according to an GSM and/or UMTS radio network standard, especially containing GERAN and/or UTRAN cells, and said second radio access technology is according to an SAE/LTE radio network standard, especially containing E-UTRAN cells.

As technical solution of the initially mentioned problem, the present invention furthermore proposes a mobile device to be operated in a mobile telecommunications network system comprising a first radio access technology, especially according to GSM/UMTS, having a first radio access network and a first network core operable to page a mobile device via at least one element of the first radio access technology and a second radio access technology, especially according to SAE/LTE, having a second radio access network and a second network core operable to page a mobile device via at least one element of the second radio access technology, which is characterised in that said mobile device comprise means for storing at least one first EPS bearer context and/or at least one first PDP context at the time when an idle or inactive state signalling reduction (ISR) is activated at the mobile device and the respective network and for supporting mobile services comprise means for using the stored at least one first EPS bearer context and/or at least one first PDP context or at least one second EPS bearer context and/or at least one second PDP context, which at least one second EPS bearer context and/or at least one second PDP context is activated between the mobile device and the respective network after the activation of the idle or inactive state signalling reduction (ISR).

A preferred embodiment of the present invention is characterised in that said at least one first EPS bearer context and/or at least one first PDP context is an at least one priori EPS bearer context and/or at least one priori PDP context and in that said at least one second EPS bearer context and/or at least one second PDP context is an at least one posterior EPS bearer context and/or at least one posterior PDP context.

Advantageously said mobile device comprise means for deactivation the idle or inactive state signalling reduction (ISR), when and only when the existing at least one first EPS bearer context and/or at least one first PDP context is modified or deleted.

In another advantageously embodiment of the invention it is provided that said mobile device comprise means for keeping the idle or inactive state signalling reduction (ISR) activated, when no second EPS bearer context or second PDP context exists at the time when an intersystem change from the first network to the second network, preferred from UTRAN/GERAN to E-UTRAN, or from the second network to the first network, preferred from E-UTRAN to UTRAN/GERAN, happens.

Another advantageously embodiment of the invention is characterised in that said mobile device comprise means to determine that when idle or inactive state signalling reduction (ISR) is activated at the mobile device and at least one mobile service between the mobile device and a network is started, whether the first EPS bearer context and/or the first PDP context stored at the mobile device is modified to setup such at least one mobile service between the mobile device and a network, and means to deactivate idle or inactive state signalling reduction (ISR) if the first EPS bearer context and/or the first PDP context stored at the mobile device is modified and means to establish a second EPS bearer context and/or a second PDP context to setup such at least one mobile service between the mobile device and a network and/or means to keep idle or inactive state signalling reduction (ISR) active after release such at least one mobile service between the mobile device and a network if the first EPS bearer context and/or the first PDP context stored at the mobile device is not modified.

A further embodiment of the invention suggests that said mobile device is operate-able with a first radio access technology according to a GSM and/or UMTS radio network standard, especially containing UTRAN and/or GERAN cells, and with a second radio access technology according to an SAE/LTE radio network standard, especially containing E-UTRAN cells.

The mobile device according to the present invention is advantageously designed and/or adapted to at least partially carry out a method according to the present invention.

Advantageously, the mobile device is a mobile device in form of a mobile phone.

BRIEF DESCRIPTION OF THE DRAWINGS

Other details, characteristics and advantages of the invention will be explained in detail in the following by means of the exemplary embodiments represented in the figures of the drawings. Herein.

DETAILED DESCRIPTION OF THE INVENTION

The concept of idle or inactive state signalling reduction (ISR) according 3GPP TS 23.401, version 8.4.1 Release 8, which is fully incorporated herein by reference, see particularly Annex J: "High level ISR description", aims at reducing the frequency of TAU and RAU (RAU: Routing Area Update) procedures caused by mobile devices (UEs: User Equipments) reselecting between a first radio access technology (RAT) and a second radio access technology (RAT), present GERAN/UTRAN and E-UTRAN, which are operated together. Especially the update signaling between the mobile device and the network is reduced. But also network internal signaling is reduced. To some extent the reduction of network internal signaling is also available when idle or inactive state signalling reduction (ISR) is not used or not activated by the network.

UMTS described already routing areas (RA: routing area) containing GERAN and UTRAN cells, which also reduces update signaling between a mobile device (UE) and network. The combination of GERAN and UTRAN into the same RAs implies however common scaling, dimensioning and configuration for GERAN and UTRAN, for example same RA coverage, same SGSN service area, no GERAN or UTRAN only access control, same physical node for GERAN and UTRAN). As an advantage it does not require any network interface functionality.

ISR enables signaling reduction with separate SGSN and MME and also with independent TAs and RAs. Thereby the interdependency is drastically minimized compared with the GERAN/UTRAN RAs. This comes however with ISR specific node and interface functionality. SGSN and MME may be implemented together, which reduces some interface functions but results also in some dependencies.

ISR support is mandatory for E-UTRAN mobile devices (UEs) that support GERAN and/or UTRAN and optional for the network. ISR requires special functionality in both the mobile device (UE) and the network, for example in the SGSN, MME, Serving GW and HSS, to activate ISR for a mobile device (UE). The network can decide for ISR activation individually for each mobile device (UE). Gn/Gp SGSNs do not support ISR functionality.

It is inherent functionality of the MM procedures to enable ISR activation only when the mobile device (UE) is able to register via E-UTRAN and via GERAN/UTRAN. For example, when there is no E-UTRAN coverage there will be also no ISR activation. Once ISR is activated it remains active until one of the criteria for deactivation in the mobile device (UE) occurs or until SGSN or MME indicate during an update procedure no more the activated ISR, for example the ISR status of the mobile device (UE) has to be refreshed with every update.

When ISR is activated this means the mobile device (UE) is registered with both MME and SGSN. Both the SGSN and the MME have a control connection with the Serving GW (GW: Gateway). MME and SGSN are both registered at HSS. The mobile device (UE) stores MM parameters from SGSN, for example P-TMSI and RA, and from MME, for example GUTI and TA(s), and the mobile device (UE) stores session management (bearer) contexts that are common for E-UTRAN and GERAN/UTRAN accesses. In idle state the mobile device (UE) can reselect between E-UTRAN and GERAN/UTRAN within the registered RA and TAs without any need to signal with network. SGSN and MME store each other's address when ISR is activated.

When ISR is activated and downlink data arrive the Serving GW initiates paging processes on SGSN and on MME. In response to paging or for uplink data transfer the performs normal Service Request procedures on the currently camped-on RAT without any preceding update signaling. It is noted, that there are existing specifics that may require RAU procedures when GERAN/UTRAN RAs are used together with ISR as for example specified in 3GPP TS 23.060: "General Packet Radio Service (GPRS); Service description; Stage 2".

The mobile device (UE) and the network run independent periodic update timers for GERAN/UTRAN and for E-UTRAN. When the MME or SGSN do not receive periodic updates MME and SGSN may decide independently for implicit detach, which removes session management (bearer) contexts from the CN node performing the implicit detach and it removes also the related control connection from the Serving GW. Implicit detach by one CN node, either SGSN or MME, deactivates ISR in the network. It is deactivated in the mobile device (UE) when the mobile device (UE) cannot perform periodic updates in time. When ISR is activated and a periodic updating timer expires the mobile device (UE) starts a Deactivate ISR timer. When this timer expires and the mobile device (UE) was not able to perform the required update procedure the mobile device (UE) deactivates ISR.

Part of the ISR functionality is also available when ISR is not activated because the MM contexts are stored in mobile device (UE), MME and SGSN also when ISR is not active. This results in some reduced network signaling, which is not available for Gn/Gp SGSNs. These SGSNs cannot handle MM and session management contexts separately. Therefore all contexts on Gn/Gp SGSNs are deleted when the mobile device (UE) changes to an MME. The MME can keep their MME contexts in all scenarios.

Figure 1:
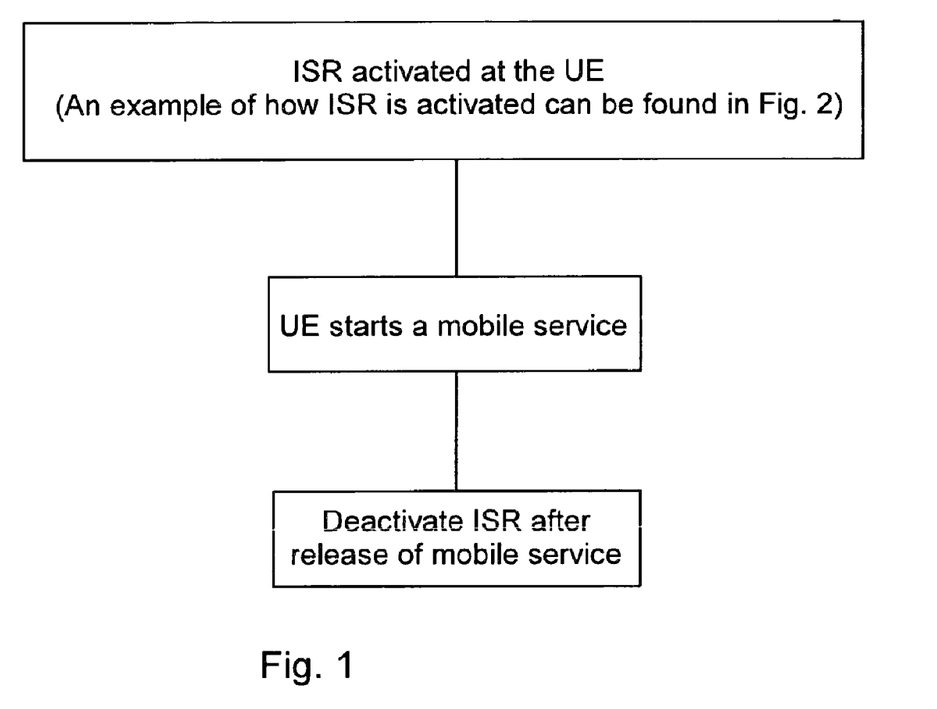
FIG. 1 is a flow chart of an example for idle or inactive state signalling reduction (ISR) according to the state of the art.
Figure 2:
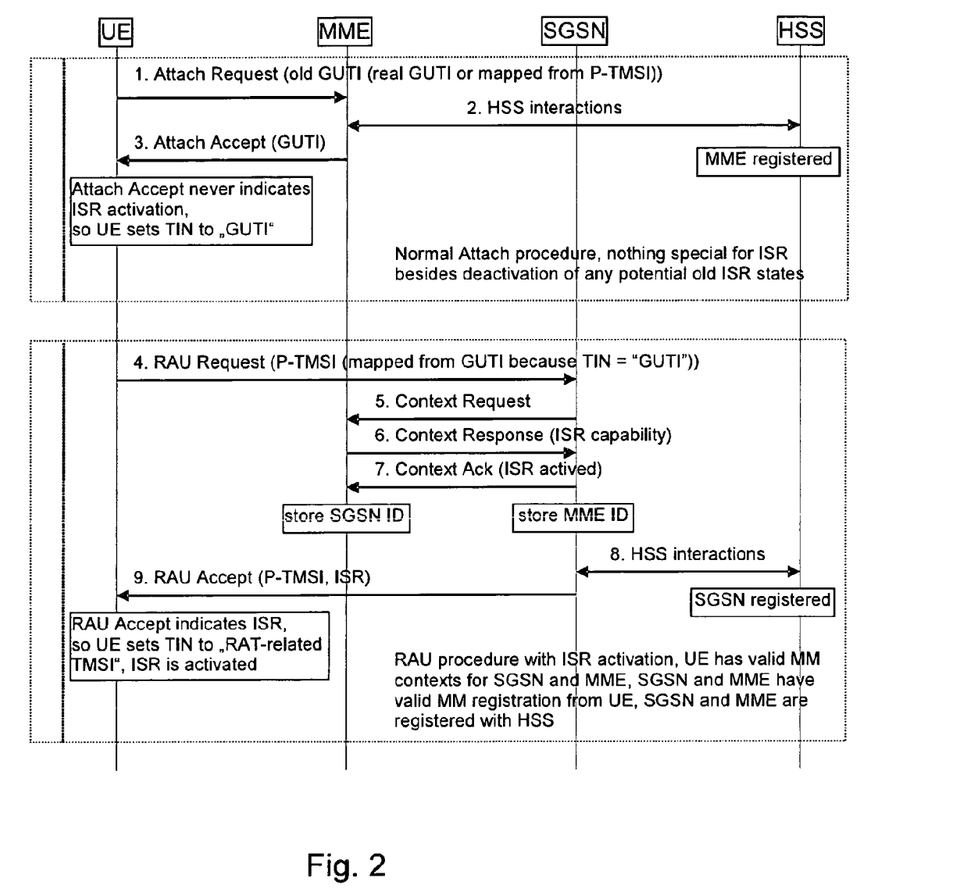
FIG. 2 is an information flow of an example for idle or inactive state signalling reduction (ISR) activation according to the state of the art.

FIG. 1 shows, when ISR is activated at the mobile device (UE)—an example of how ISR is activated is shown in FIG. 2—and the mobile device (UE) starts a new mobile service, for example makes a new call, the ISR is deactivated after the call release. This happens according the state of the art for the case either a priori context—this is according to the present invention an EPS bearer context and/or a PDP context stored at the mobile device (UE) at the time when ISR is activated at the mobile device (UE) and according to the present invention there may be more than one such EPS bearer context and/or a PDP context at the mobile device (UE)—is modified or a posterior context—this is according to the present invention any EPS bearer context and/or a PDP context activated at the mobile device (UE) after the ISR is activated—is established to start the mobile service, for example to setup the call.

The information flow in FIG. 2 shows an example of ISR activation. For explanatory purposes FIG. 2 is simplified to show the MM parts only.

The ISR activation makes use of the so called TIN (TIN: Temporary Identity used in Next update). Since the mobile device (UE) may have valid MM parameters both from MME and from SGSN. The TIN is a parameter of the mobile device's (UE's) MM context, which identifies the mobile device (UE) identity to be indicated in the next RAU Request or TAU Request message. The TIN also identifies the status of ISR activation in the mobile device (UE).

The TIN can take one of the three values, "P-TMSI", "GUTI" or "RAT-related TMSI". The mobile device (UE) sets the TIN when receiving an attach accept, a TAU accept or RAU accept message according to the rules shown in the following table for setting of the TIN:

| Message received by mobile device (UE) | TIN value stored by mobile device (UE) | TIN value set by the mobile device (UE) when receiving message |
| --- | --- | --- |
| Attach Accept via E-UTRAN (never indicates ISR activation) | Any value | GUTI |
| Attach Accept via GERAN/UTRAN (never indicates ISR activation) | Any value | P-TMSI |
| TAU Accept not indicating ISR | Any value | GUTI |
| TAU Accept indicating ISR | GUTI | GUTI |
|  | P-TMSI or RAT-related TMSI | RAT-related TMSI |
| RAU Accept not indicating ISR | Any value | P-TMSI |
| RAU Accept indicating ISR | P-TMSI | P-TMSI |
|  | GUTI or RAT-related TMSI | RAT-related TMSI |

ISR activation indicated by the RAU/TAU accept message but the mobile device (UE) not setting the TIN to "RAT-related TMSI" is a special situation. Here the mobile device (UE) has deactivated ISR due to special situation handling. By maintaining the old TIN value the mobile device (UE) remembers to use the RAT TMSI indicated by the TIN when updating with the CN node of the other RAT.

Only if the TIN is set to "RAT-related TMSI" ISR behavior is enabled for the mobile device (UE), for example the mobile device (UE) can change between all registered areas and RATs without any update signaling and it listens for paging on the RAT it is camped on. If the TIN is set to "RAT-related TMSI", the mobile device's (UE's) P-TMSI and RAI as well as its GUTI and TAI(s) remain registered with the network and valid in the mobile device (UE).

When ISR is not active the TIN is always set to the temporary ID belonging to the currently used RAT. This guarantees that always the most recent context data are used, which means during inter-RAT changes there is always context transfer from the CN node serving the last used RAT. The mobile device (UE) identities, old GUTI IE and additional GUTI IE, indicated in the next TAU Request message, and old P-TMSI IE and additional P-TMSI/RAI IE, indicated in the next RAU Request message depend on the setting of TIN as given in the table above.

Old mobile device (UE) Identities to be used in TAU/RAU request (old GUTI or old P-TMSI/RAI) are shown in the following table:

| Message to be sent by the mobile device (UE) | TIN value: P-TMSI | TIN value: GUTI | TIN value: RAT-related TMSI |
| --- | --- | --- | --- |
| TAU Request | GUTI mapped from P-TMSI/RAI | GUTI | GUTI |
| RAU Request | P-TMSI/RAI | P-TMSI/RAI mapped from GUTI | P-TMSI/RAI |

The mobile device (UE) indicates also information elements "additional GUTI" or "additional P-TMSI" in the TAU or RAU request, respectively. These information elements permit the MME/SGSN to find the already existing mobile device (UE) contexts when the "old GUTI" or "old P-TMSI" indicates values that are mapped from other identities.

The process of ISR activation shown in FIG. 2 starts with an ordinary attach procedure not requiring any special functionality for support of ISR. The attach according to the state of the art however deletes any existing old ISR state information stored in the mobile device (UE). With the attach request message, the mobile device (UE) sets it's TIN to "GUTI". After attach with MME, the mobile device (UE) may perform any interactions via E-UTRAN without changing the ISR state. ISR remains deactivated. One or more bearer contexts are activated on MME, Serving GW and PDN GW, which is not shown in FIG. 2.

The first time the mobile device (UE) reselects GERAN or UTRAN it initiates a routing area update (RAU: routing area update). This represents an occasion to activate ISR. The TIN indicates "GUTI" so the mobile device (UE) indicates a P-TMSI mapped from a GUTI in the RAU request. The SGSN gets contexts from MME and both CN nodes keep these contexts because ISR is being activated. The SGSN establishes a control relation with the Serving GW, which is active in parallel to the control connection between MME and Serving GW (not shown in FIG. 2). The RAU accept indicates ISR activation to the mobile device (UE). The mobile device (UE) keeps GUTI and P-TMSI as registered, which the mobile device (UE) memorises by setting the TIN to "RAT-related TMSI". The MME and the SGSN are registered in parallel with the HSS.

After ISR activation, the mobile device (UE) may reselect between E-UTRAN and UTRAN/GERAN without any need for updating the network as long as the mobile device (UE) does not move out of the RA/TA(s) registered with the network.

The network is not required to activate ISR during a RAU or TAU. The network may activate ISR at any RAU or TAU that involves the context transfer between an SGSN and an MME. The RAU procedure for this is shown in FIG. 2. ISR activation for a mobile device (UE), which is already attached to GERAN/UTRAN, with a TAU procedure from E-UTRAN works in a very similar way.

Figure 3:
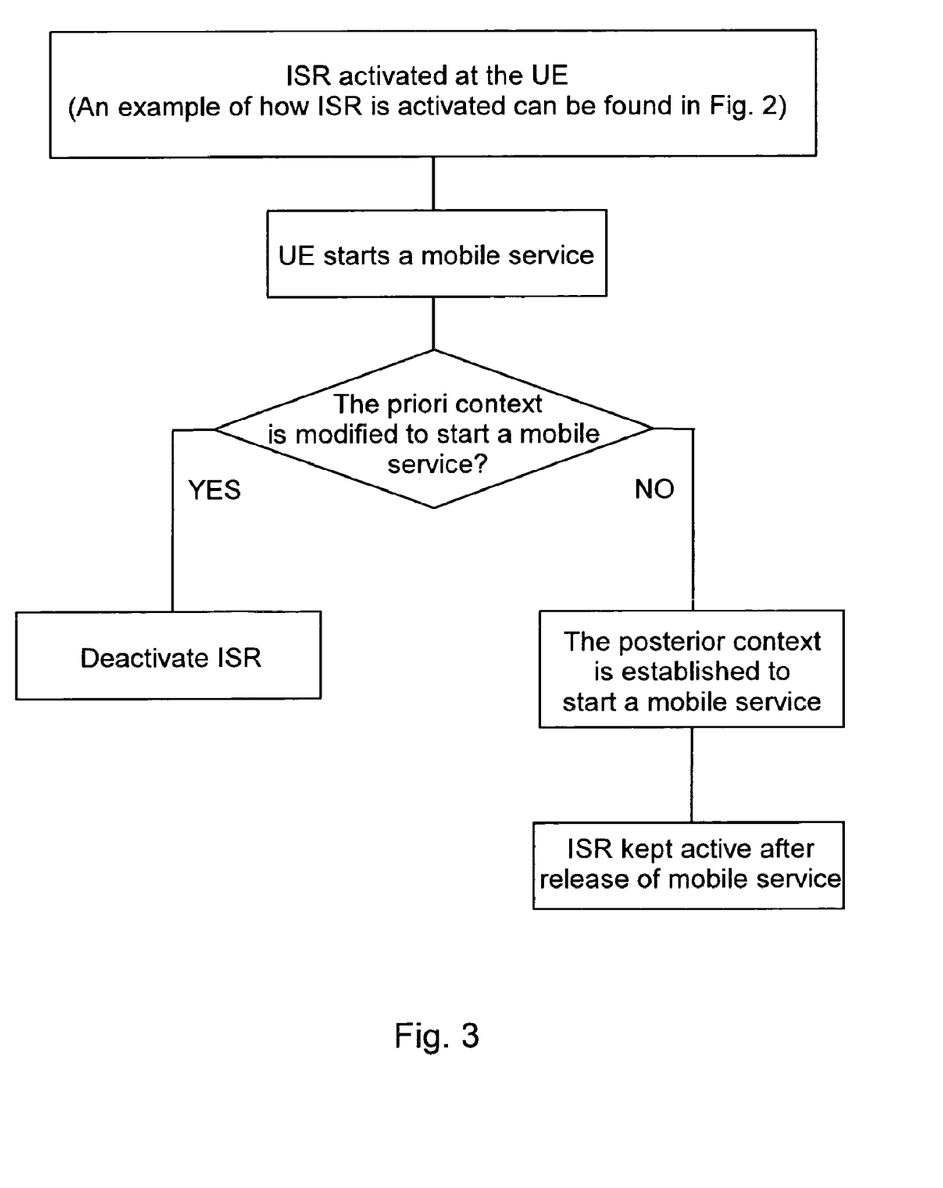
FIG. 3 is a flow chart of an example for idle or inactive state signalling reduction (ISR) according to the present invention.

FIG. 3 shows a flow chart of an example for idle or inactive state signalling reduction (ISR) according to the present invention, which changes the behavior of the mobile device (UE) concerning the information flow according to the state of the art, which is shown in FIG. 1. When ISR is activated at the mobile device (UE)—an example of how ISR is activated is shown in FIG. 2—and the mobile device (UE) starts a new mobile service, for example makes a new call, it is determined, whether the priori context—this is according to the present invention an EPS bearer context and/or a PDP context stored at the mobile device (UE) at the time when ISR is activated at the mobile device (UE) and according to the present invention there may be more than one such EPS bearer context and/or a PDP context at the mobile device (UE)—is modified to start the mobile service, for example to setup the call. If the priori context is modified ISR is deactivated. If the priori context is not modified, a posterior context—this is according to the present invention any EPS bearer context and/or a PDP context activated at the mobile device (UE) after the ISR is activated—is established to start the mobile service, for example to setup the call, and ISR is kept active after call release.

Especially from the point of view of the information flow with this are given two advantageously cases according the present invention:

Case 1:

After ISR is successfully activated, if any of the priori-ISR EPS bearer context and/or PDP context is modified, the mobile device (UE) set TIN="GUTI". This is due to two factors that a) the modification of the priori-ISR EPS bearer context and/or priori-ISR PDP context may lead to the changing of the S1-TEID. Given this fact, even if two consecutive modifications, especially a deactivation followed by an activation, do not alter the configuration and/or parameters of the priori-ISR EPS bearer context and/or priori-ISR PDP context, keeping ISR active at the mobile device (UE) may lead to packets routing error, and b) the comparison of the configuration and/or the parameters of two EPS bearer context and/or PDP context inevitably entails large complexities for implementation.

Case 2:

At the time when a mobile device (UE) with its TIN="RAT-related TMSI" changes from S1 mode to A/Gb mode or Iu mode, if the mobile device (UE) has no posterior-ISR EPS bearer context and/or posterior-ISR PDP context, it is preferred according to the present invention that the mobile device (UE) shall not change its setting of TIN. Otherwise, the UE shall set TIN="GUTI".

The exemplary embodiments of the invention represented in the figures of the drawings and described in connection with these one only serve for explaining the invention and are not limiting for this one.

What is claimed is:

1. A method for reducing signalling loads from a mobile device to a mobile telecommunications network system comprising a first radio access technology having a first radio access network and a first network core operable to page a mobile device via at least one element of the first radio access technology and a second radio access technology having a second radio access network and a second network core operable to page a mobile device via at least one element of the second radio access technology due to intersystem changes, wherein at the time when an idle or inactive state signalling reduction is activated at the mobile device and the respective network the mobile device stores at least one priori EPS bearer context and/or at least one priori PDP context which stored at least one priori EPS bearer context and/or at least one priori PDP context is usable by the mobile device for supporting mobile services, characterized in that after the activation of the idle or inactive state signalling reduction at least one posterior EPS bearer context and/or at least one posterior PDP context is activated between the mobile device and the respective network, which at least one posterior EPS bearer context and/or at least one posterior PDP context is used by the mobile device for supporting mobile services, and wherein the idle or inactive state signalling reduction keeps activated, when no posterior EPS bearer context or posterior PDP context exists at the time when an intersystem change from the first network to the second network or from the second network to the first network happens.

2. The method according to claim 1, characterised in that for supporting mobile services at least one mobile service is started between the mobile device and a network.

3. The method according claim 2, characterised in that said at least one mobile service between the mobile device and a network is started initiated by the mobile device and/or is started initiated by a network.

4. The method according to claim 1, characterised in that the idle or inactive state signalling reduction is deactivated, when and only when the existing at least one priori EPS bearer context and/or at least one priori PDP context is modified or deleted.

5. The method according to claim 1, characterised in that when idle or inactive state signalling reduction is activated at the mobile device and at least one mobile service between the mobile device and a network is started it is determined, whether the priori EPS bearer context and/or the priori PDP context stored at the mobile device is modified to setup such at least one mobile service between the mobile device and a network, whereby if the priori EPS bearer context and/or the priori PDP context stored at the mobile device is modified idle or inactive state signalling reduction is deactivated and if the priori EPS bearer context and/or the priori PDP context stored at the mobile device is not modified, a posterior EPS bearer context and/or a posterior PDP context is established to setup such at least one mobile service between the mobile device and a network and idle or inactive state signalling reduction is kept active after release such at least one mobile service between the mobile device and a network.

6. The method according to claim 5, wherein said first radio access technology is according to an GSM and/or UMTS radio network standard, and said second radio access technology is according to an LTE radio network standard.

7. The method according to claim 6, wherein said first radio access technology is according to an GSM and/or UMTS radio network standard containing GERAN and/or UTRAN cells, and said second radio access technology is according to an LTE radio network standard, containing E-UTRAN cells.

8. A mobile device structured to be operated in a mobile telecommunications network system comprising a first radio access technology having a first radio access network and a first network core operable to page a mobile device via at least one element of the first radio access technology and a second radio access technology having a second radio access network and a second network core operable to page a mobile device via at least one element of the second radio access technology, characterised in that
said mobile device
comprises
means for storing at least one priori EPS bearer context and/or at least one priori PDP context at the time when an idle or inactive state signalling reduction is activated at the mobile device -and the respective network and
means for using
the stored at least one priori EPS bearer context and/or at least one priori PDP context
for supporting mobile services,
characterised in that
the mobile device
comprises
means for using
at least one posterior EPS bearer context and/or at least one posterior PDP context,
which at least one posterior EPS bearer context and/or at least one , posterior PDP context is activated between the mobile device and the respective network after the activation of the idle or inactive state signalling reduction and
means for keeping the idle or inactive state signalling reduction activated, when no posterior EPS bearer context or posterior PDP context exists at the time when an intersystem change from the first network to the second network or from the second network to the first network happens.

9. The mobile device according to claim 8, characterised in that said mobile device comprises means for deactivating the idle or inactive state signalling reduction, when and only when the existing at least one priori EPS bearer context and/or at least one priori PDP context is modified or deleted.

10. The mobile device according to claim 8, characterised in that said mobile device comprises means to determine that when idle or inactive state signalling reduction is activated at the mobile device and at least one mobile service between the mobile device and a network is started, whether the priori EPS bearer context and/or the priori PDP context stored at the mobile device is modified to setup such at least one mobile service between the mobile device and a network, and means to deactivate idle or inactive state signalling reduction if the priori EPS bearer context and/or the priori PDP context stored at the mobile device is modified and means to establish a posterior EPS bearer context and/or a posterior PDP context to setup such at least one mobile service between the mobile device and a network and/or means to keep idle or inactive state signalling reduction active after release such at least one mobile service between the mobile device and a network if the priori EPS bearer context and/or the priori PDP context stored at the mobile device is not modified.

11. The mobile device according to claim 8, characterised in that said mobile device is operable with a first radio access technology according to an GSM and/or UMTS radio network standard, and with a second radio access technology according to an LTE radio network standard.

12. The mobile device according to claim 8 comprising:
storage for at least one first EPS bearer context and/or at least one first PDP context at the time when an idle or inactive state signalling reduction is activated at the mobile device;
structure for being paged by a first radio access technology having a first radio access network and a first network core operable to page the mobile device via at least one element of the first radio access technology;
structure for being paged by a second radio access technology having a second radio access network and a second network core operable to page a mobile device via at least one element of the second radio access technology; and,
such that the respective network and supporting mobile services use the stored at least one first EPS bearer context and/or at least one first PDP context or at least one second EPS bearer context and/or at least one second PDP context, which at least one second EPS bearer context and/or at least one second PDP context is activated between the mobile device and the respective network after the activation of the idle or inactive state signalling reduction.

13. The mobile device according to claim 11, characterised in that said mobile device is operable with a first radio access technology according to an GSM and/or UMTS radio network standard containing UTRAN and/or GERAN cells, and with a second radio access technology according to an LTE radio network standard, containing E-UTRAN cells.

* * * * *